(12) United States Patent  (10) Patent No.: US 9,055,263 B2
Umeda et al.  (45) Date of Patent: Jun. 9, 2015

(54) APPARATUS, METHOD AND COMPUTER PROGRAM FOR CORRECTING AN IMAGE USING LOOKUP TABLES GENERATED BY INPUTTED IMAGE ANALYSIS

(75) Inventors: Kiyoshi Umeda, Kawasaki (JP); Ryosuke Iguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 742 days.

(21) Appl. No.: 12/778,917

(22) Filed: May 12, 2010

(65) Prior Publication Data

US 2010/0303351 A1 Dec. 2, 2010

(30) Foreign Application Priority Data

May 28, 2009 (JP) ................................. 2009-128568

(51) Int. Cl.
*G06K 9/00* (2006.01)
*H04N 1/60* (2006.01)
*H04N 1/62* (2006.01)

(52) U.S. Cl.
CPC ... *H04N 1/60* (2013.01); *H04N 1/62* (2013.01)

(58) Field of Classification Search
None
See application file for complete search history.

(56) References Cited

U.S. PATENT DOCUMENTS

| 6,628,825 B1 | 9/2003 | Yamazoe et al. |
| 6,807,316 B2 | 10/2004 | Enomoto |
| 7,440,612 B2 | 10/2008 | Ogata et al. |
| 2005/0259184 A1* | 11/2005 | Brett ............................. 348/630 |
| 2005/0286796 A1* | 12/2005 | Handley et al. ................ 382/274 |
| 2008/0211924 A1* | 9/2008 | Sugimori .................... 348/222.1 |
| 2008/0226151 A1* | 9/2008 | Zouridakis et al. ........... 382/133 |
| 2009/0034837 A1* | 2/2009 | Kato et al. ..................... 382/167 |
| 2009/0034838 A1* | 2/2009 | Umeda et al. ................. 382/167 |
| 2009/0034840 A1 | 2/2009 | Umeda et al. |

FOREIGN PATENT DOCUMENTS

| CN | 1874410 A | 12/2006 |
| JP | 2000-013616 A | 1/2000 |
| JP | 2001-298619 A | 10/2001 |
| JP | 3233114 B2 | 11/2001 |

OTHER PUBLICATIONS

XP007918533; "Local Color Correction Using Non-Linear Masking"; Nathan Moroney; Hewlett-Packard Laboratories; Palo Alto, California, 2000.

* cited by examiner

*Primary Examiner* — Nirav G Patel
(74) *Attorney, Agent, or Firm* — Canon U.S.A., Inc. IP Division

(57) ABSTRACT

An image processing apparatus includes a unit configured to calculate a plurality of characteristic amounts from an input image, a unit configured to calculate a first multidimensional lookup table based on the characteristic amounts, a unit configured to calculate attribute information of a specific object from the input image, a unit configured to calculate a second multidimensional lookup table based on the attribute information, a unit configured to generate a control parameter from the input image, an interpolation unit configured to apply the first and second multidimensional lookup tables to the input image, and a control unit configured to control interpolation intensity of the second multidimensional lookup table using the control parameter.

21 Claims, 17 Drawing Sheets

APPARATUS, METHOD AND COMPUTER PROGRAM FOR CORRECTING AN IMAGE USING LOOKUP TABLES GENERATED BY INPUTTED IMAGE ANALYSIS

BACKGROUND OF THE INVENTION

1. Field of the Invention

The present invention relates to an image processing apparatus and an image processing method that corrects brightness of an input image.

2. Description of the Related Art

Conventionally, various methods to execute various corrections to photo image data taken by a digital camera to display and print a suitable photo image have been discussed. Such an image correction method can be roughly divided into two methods. One is a uniform correction that executes a uniform correction on an entire image and the other is a local correction in which a correction amount changes according to local properties of an image.

Examples of the former uniform correction include a color balance correction as discussed in Japanese Patent Application Laid-Open No. 2000-013616. In Japanese Patent Application Laid-Open No. 2000-013616, a luminance histogram of an image is calculated and a highlight/shadow point in the image is calculated according to cumulative frequency. If a color difference component of the highlight/shadow point is 0, the color balance of the image data is determined to be appropriate. If the color difference component of the highlight/shadow point is not 0, on the other hand, the color balance is determined to be lost and a rotation matrix that makes the color difference of the highlight/shadow point 0 in the luminance/color difference space is uniformly applied to the image.

Regarding the latter local correction, on the other hand, examples include image processing of a type, as typified by a dodging process, in which the correction amount changes according to a spatial position of the image. The dodging process is, for example, if a subject such as a person is dark and the background is bright, to correct brightness of a person area appropriately while suppressing overexposure of the background by significantly increasing luminance of the dark person area and changing the luminance of the bright background area not so much. Japanese Patent Application Laid-Open No. 2001-298619 and Japanese Patent No. 3233114 have discussed such a dodging process. Both realize the dodging process in digital processing by generating a low-frequency image, that is, a blurred image by performing filtering on an input image and using the blurred image as a spatial brightness control factor.

Printers in recent years have various functions and are provided with, in addition to printing, a copy function and a function to directly print photo data from a memory card as standard functions. Further, enhancement in a printing speed in recent years has also been remarkable and continuous enhancement has been demanded for the future. On the other hand, hardware resources mounted in a printer have not been as abundant as those on a personal computer in recent years. A central processing unit (CPU) speed, a random access memory (RAM) capacity, and an access speed of the RAM have generally limited capabilities. Further, demands for cost reduction of a printer main body are severe, and thus image processing that can operate with as low resources as possible has been desired. In other words, hardware performance of a printer main body has been confronted with a mutually contradictory situation in which performance improvement of the printer speed and the like has been desired while capabilities thereof being maintained or reduced.

Under such circumstances, image processing using a three-dimensional lookup table (hereinafter, referred to as a 3DLUT) is discussed as an effective unit for performing image processing at a high speed. Effectiveness of image processing using the 3DLUT system will be described below. For example, a case where a color balance correction, luminance gradation correction, and saturation correction like those discussed in Japanese Patent Application Laid-Open No. 2000-013616 are performed simultaneously on an input image is considered. A calculation amount when the above processing is performed on each of all pixels of the entire image and that when pixels of the entire image are corrected by interpolation calculation by constituting a corrected red-green-blue (RGB) 3DLUT.

First, the former case where processing is performed on each of the entire image is considered. If each pixel value of the input image is represented in RGB, the pixel value is converted into, for example, YCbCr values which are a luminance color difference space. This processing requires nine multiplications. A three-dimensional rotation matrix for correction as discussed in Japanese Patent Application Laid-Open No. 2000-013616 is applied to the YCbCr values to obtain Y'Cb'Cr' values after the color balance correction. This processing requires nine multiplications. Next, a predetermined gradation correction is performed on the Y' value to obtain a Y" value. Further, the Cb'Cr' values are multiplied by a saturation enhancement coefficient to obtain Cb'Cr' values. This processing requires two multiplications. Lastly, the corrected Y"Cb"Cr" values are converted into R"G"B" values using a publicly known formula. This processing requires nine multiplications. Therefore, this sequence of processing requires a total of 29 multiplications. If this processing is repeated for each pixel, 174 million multiplications are needed for an image of, for example, 3000*2000 pixels.

A case where, on the other hand, a 3DLUT is used will be described. As is well known, according to a system using the 3DLUT, the 3DLUT is divided into a grid pattern having predetermined intervals therein and the corrected RGB values are calculated for each grid point and stored. It is assumed that, for example, the grid interval is 32 and 9^3=729 grid points are present. If the above processing is performed for the RGB values at each grid point, 29*729 multiplications are needed. The 3DLUT generated in this manner is applied to each pixel by publicly known interpolation calculations. If, for example, tetrahedral interpolation is used, corrected RGB values can be obtained by five multiplications per pixel. More specifically, the number of multiplications by the 3DLUT for the entire image is represented by the following formula:

Number of multiplications=29*729+(3000*4000)*5=about 60.02 million

Comparison of total multiplications of both shows that the number of calculations of the latter is about ⅓ of that of the former so that the 3DLUT system turns out to be extremely effective.

On the other hand, among photo images captured by an ordinary amateur photographer who is not a professional photographer, there are many images including a plurality of failure factors such as a backlight photo with color fog. For such images, the color fog is removed by the color balance correction and then, very complex correction processing, such as increasing a luminance component for only a dark subject region while leaving the background as it is, is needed.

Considering that a local correction as typified by a dodging process correction and a uniform correction throughout an image like the color balance correction are performed simultaneously, there is an issue that it is very difficult to control using only one 3DLUT like the above one.

The 3DLUT is applied, as described above, by interpolation calculations and thus, for example, extracting only a brightness component from interpolated pixel values to locally control the component may be conceivable, but processing is made thereby more complex which increases scale of calculations and that of circuits necessary for realization.

SUMMARY OF THE INVENTION

The present invention is directed to realization of a uniform correction throughout an image (for example, a color balance correction) and a local correction (for example, a dodging process) in a system that does not include high-performance hardware resources (for example, a CPU and a RAM) by a low memory of low calculation amount.

According to an aspect of the present invention, an image processing apparatus including a unit configured to calculate a plurality of characteristic amounts from an input image, a unit configured to calculate a first multidimensional lookup table based on the characteristic amounts, a unit configured to calculate attribute information of a specific object from the input image, a unit configured to calculate a second multidimensional lookup table based on the attribute information, a unit configured to generate a control parameter from the input image, and an interpolation unit configured to apply the first and second multidimensional lookup tables to the input image includes a control unit configured to control interpolation intensity of the second multidimensional lookup table using the control parameter.

According to another aspect of the present invention, a method for processing an image including calculating a plurality of characteristic amounts from an input image, calculating a first multidimensional lookup table based on the characteristic amounts, calculating attribute information of a specific object from the input image, calculating a second multidimensional lookup table based on the attribute information, generating a control parameter from the input image, and interpolating by applying the first and second multidimensional lookup tables to the input image includes controlling interpolation intensity of the second multidimensional lookup table using the control parameter.

According to yet another aspect of the present invention, a computer program causes a computer to function as an image processing apparatus including a unit configured to calculate a plurality of characteristic amounts from an input image, a unit configured to calculate a first multidimensional lookup table based on the characteristic amounts, a unit configured to calculate attribute information of a specific object from the input image, a unit configured to calculate a second multidimensional lookup table based on the attribute information, a unit configured to generate a control parameter from the input image, an interpolation unit configured to apply the first and second multidimensional lookup tables to the input image, and a control unit configured to control interpolation intensity of the second multidimensional lookup table using the control parameter.

According to the present invention, a plurality of interpolation units is connected in series, and uniform correction processing is performed on an entire image by one interpolation unit and interpolation intensity thereof is controlled by the other interpolation unit using control parameters. Accordingly, a conventional challenge of processing that simultaneously performs the uniform correction and the local correction can be realized by a very simple configuration.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A first exemplary embodiment of the present invention will be described below. The description below assumes an image processing unit inside a printer main body. However, this shows an exemplary embodiment only as an example and the present invention is not limited to the exemplary embodiment described below.

Figure 2:
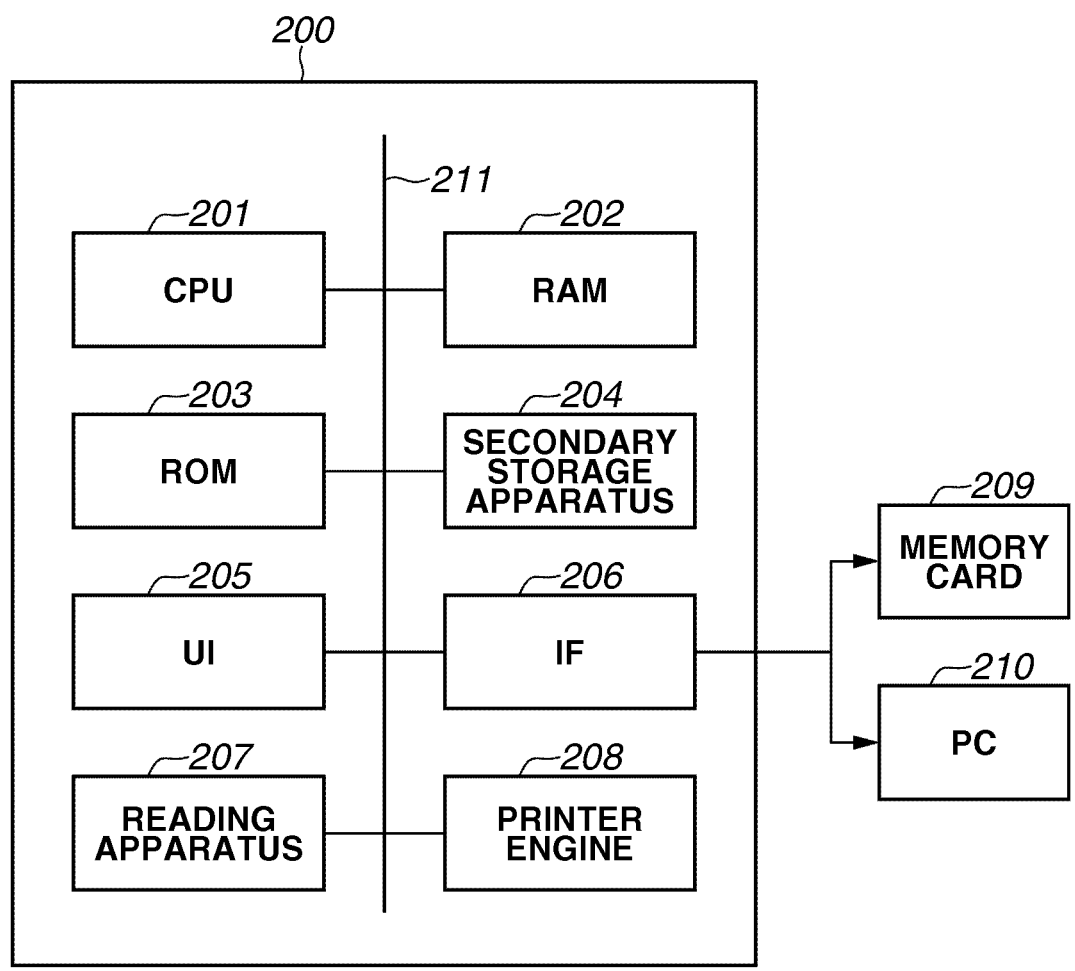
FIG. 2 illustrates a hardware configuration example which can be implemented by the present invention.

FIG. 2 illustrates a configuration example of hardware 200 capable of executing an image processing method in the present exemplary embodiment. The hardware 200 includes a CPU 201, a RAM 202, a read-only memory (ROM) 203 in which various control programs/tables are stored, and a secondary storage apparatus 204 (for example, a hard disk). The hardware 200 includes a user interface 205 (for example, a button or display apparatus) and an external interface 206 (for example, universal serial bus (USB) (trademark) or a memory card reader). Image data is read from a memory card 209 or a personal computer 210 is connected via the interface 206 (hereinafter, denoted as the "IF 206"). The hardware 200 further includes a document reading apparatus 207 (for example, a scanner) and a printer engine 208.

Figure 1:
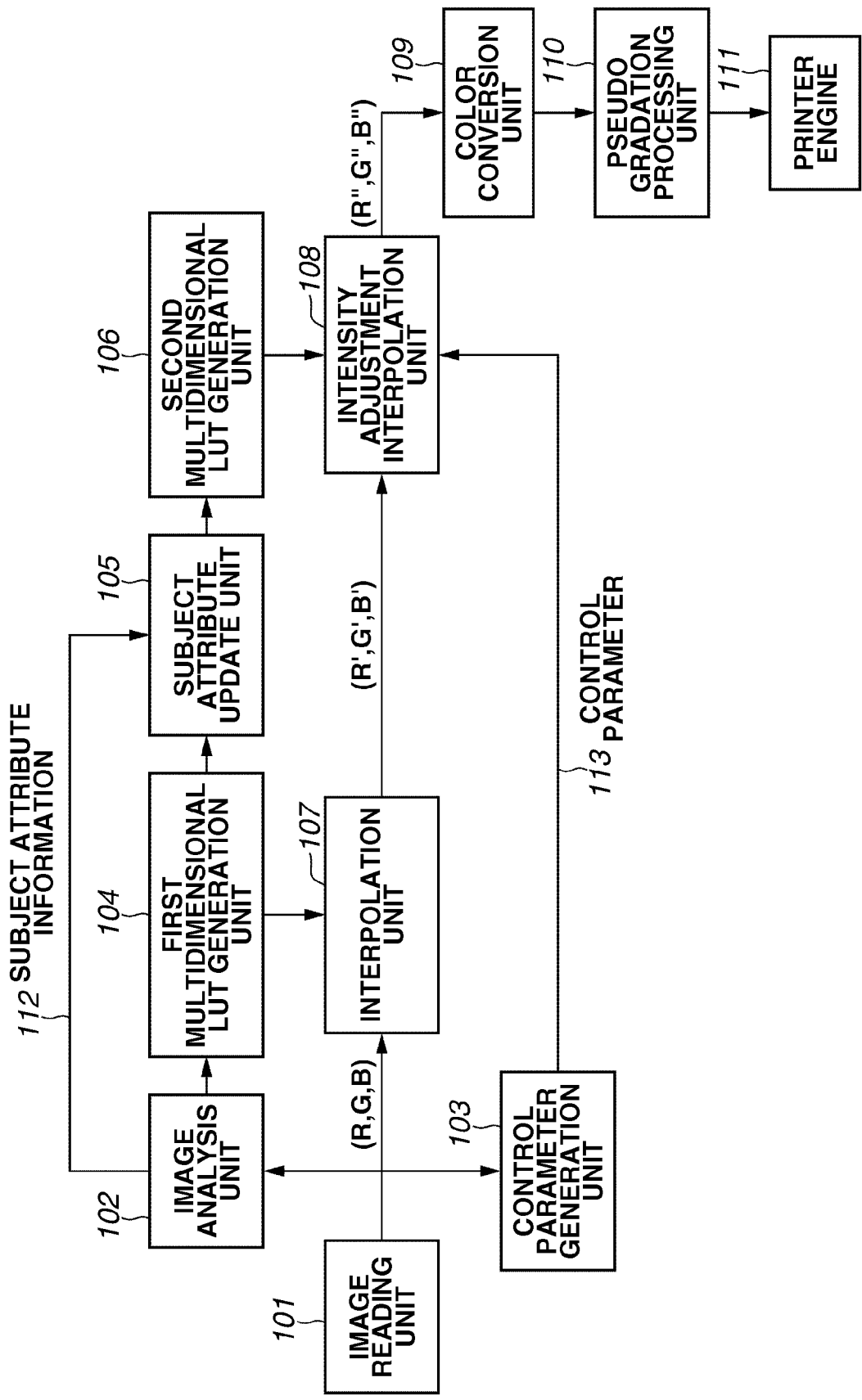
FIG. 1 illustrates a block diagram of a first exemplary embodiment of the present invention.

FIG. 1 illustrates a block diagram of processing in the present exemplary embodiment. FIG. 1 is a block diagram of the hardware 200. As illustrated in FIG. 1, an input image is corrected by a configuration in which two interpolation units 107 and 108 are connected in series in the present exemplary embodiment. While details will be described below, interpolation intensity of the latter interpolation unit 108 can be controlled by a control parameter.

When, for example, an instruction to perform print processing is input to a printer via the IF 206 by a user, first an image reading unit 101 reads image data to be processed from a memory card connected to the IF 206 or the image reading apparatus 207. Next, an image analysis unit 102 performs analysis processing of the image to calculate a characteristic quantity from the image data. The image analysis unit according to the present exemplary embodiment detects a face region of a person using publicly known face detection technique and calculates attribute values (such as average luminance and color difference component) of the face region to determine whether the face region is underexposed. Further, the image analysis unit calculates a histogram for the entire image and analyzes the result thereof to determine a degree of appropriateness of color balance of the image. The analysis result is input into a first multidimensional LUT generation unit 104 (first multidimensional lookup table generation means) to generate a first 3DLUT (a first multidimensional lookup table, here a three-dimensional lookup table) to correct the color balance of the entire image.

Next, a subject attribute update unit 105 updates subject attribute information by using attribute information (for example, the average luminance value of the subject's face) of the subject (specific object) analyzed by the image analysis unit 102 and the first 3DLUT. More specifically, the first 3DLUT is applied to the subject attribute information by a publicly known interpolation method to calculate attribute information corrected by the first 3DLUT.

The updated attribute information is input into a second multidimensional LUT generation unit 106 (second multidimensional lookup table generation means). The second multidimensional LUT generation unit 106 generates a second 3DLUT (a second lookup table, here a three-dimensional lookup table) specialized for adjusting the subject. The second 3DLUT is generated based on the updated subject attribute information input to the second multidimensional LUT generation unit 106.

As the last step of preparations before correction processing, a control parameter generation unit 103 (control parameter generation means) generates a parameter to control interpolation intensity by the intensity adjustment interpolation unit 108. More specifically, the control parameter generation unit 103 generates a blurred image by filtering on an input image and inputs the generated blurred image into the intensity adjustment interpolation unit 108 as a control parameter 113.

Accordingly, generation of two 3DLUTs and the control parameter is completed.

The flow of correction processing will be described below. The image data read by the image reading unit 101 is input into the interpolation unit 107 pixel by pixel in which the first 3DLUT is applied by a publicly known interpolation method. The applied pixel value is input into the intensity adjustment interpolation unit 108 in which the second 3DLUT is applied by a publicly known interpolation method. At this point, interpolation intensity of the second 3DLUT is controlled for each local region of the image according to the control parameter. The image data in which correction is completed with the above processing is converted into CMYK ink colors by a color conversion unit 109. Pseudo gradation processing such as error diffusion and dithering is performed on the image data by a pseudo gradation processing unit 110. Then, the image data is formed as an image on a print medium by the printer engine 111.

The block diagram of processing in the present exemplary embodiment has been described above.

Detailed processing in each block will be described below with reference to a flow chart.

The image reading unit 101 reads image data to be processed. Reading can be realized by reading the image data contained in a memory card connected via the IF 206 or reading data obtained by optically scanning a document using the reading apparatus 207. The read image data is sent to the following processing together with flag information for identifying whether the color space thereof is, for example, the sRGB space or the Adobe RGB (registered trademark of US Adobe Systems) space, or any other color space.

Figure 3:
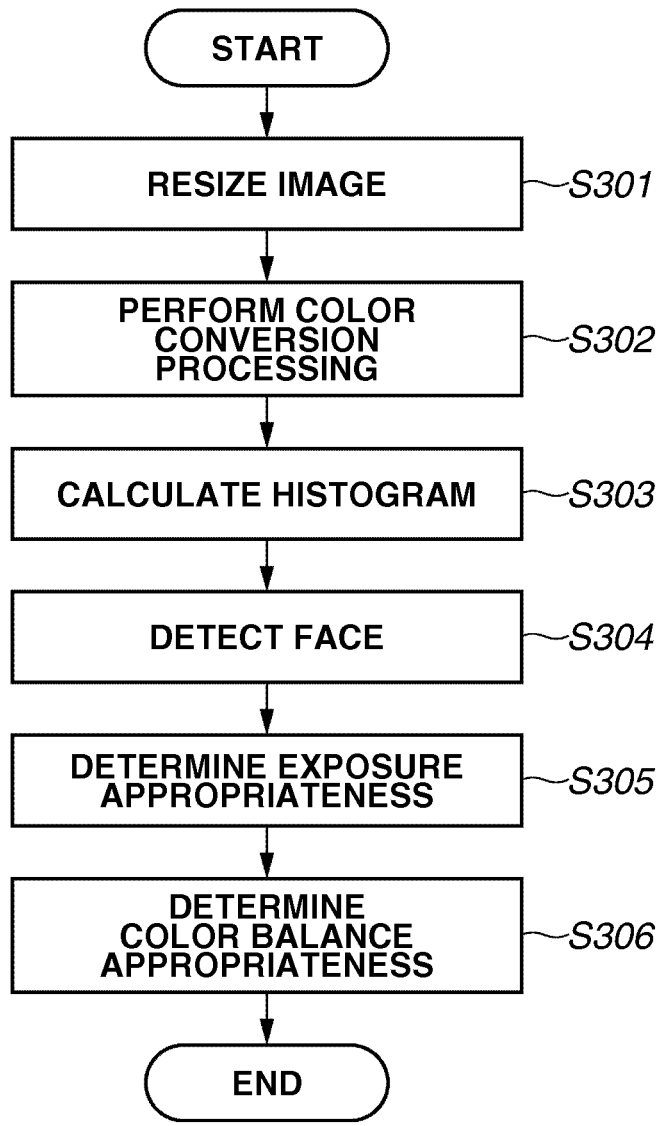
FIG. 3 illustrates a flow chart of processing executed by an image analysis unit according to the present invention.

FIG. 3 illustrates a flow chart of processing executed by the image analysis unit 102. A program to perform the processing is loaded into the RAM 202 from the secondary storage apparatus 204 during execution and is executed under the control of the CPU 201.

In step S301, an input image is resized. If the input image includes, for example, 4000*3000 pixels, throughput necessary for histogram calculation or face detection processing is vast if such processing is performed for all pixels. The face detection processing or histogram calculation processing can reduce the overall throughput by lowering resolution necessary to exhibit characteristics of the image and performing the processing on the low-resolution image. Though the lower resolution is not defined, for example, lowering the resolution to the video graphics array (VGA) size (corresponding to 640*480 pixels).

Next, color conversion processing is performed on the low-resolution image. This is because parameter design in an exposure appropriateness determination unit or the like in the following analysis processing is made easier by performing processing in a common color space. The sRGB color space is selected in the present exemplary embodiment. In step S302, if any other color space is input, the color space is converted into the sRGB color space using a publicly known conversion unit.

Figure 4:
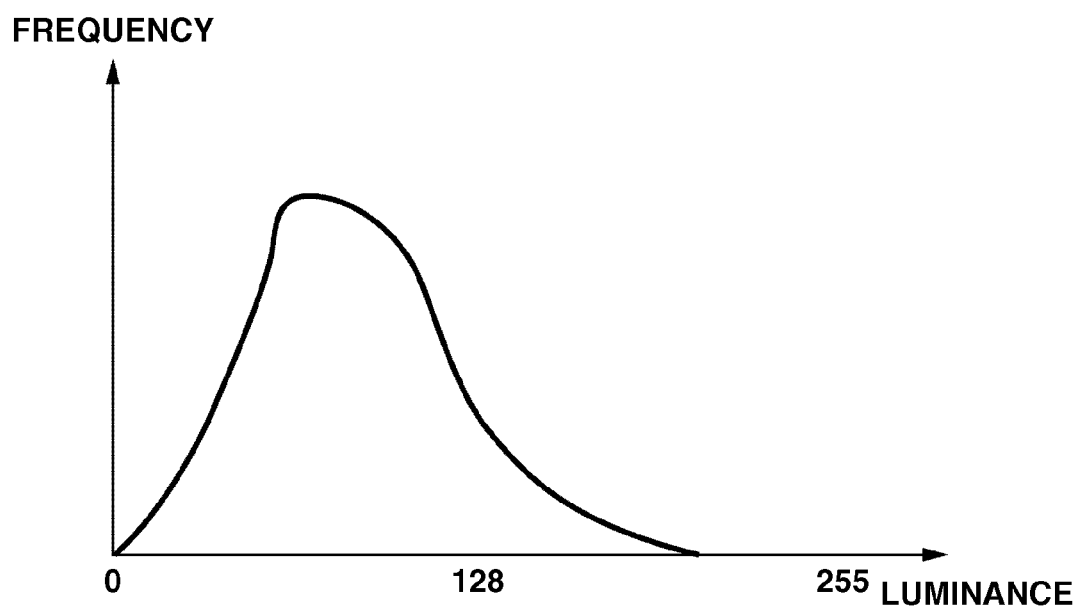
FIG. 4 illustrates a luminance histogram.

Next, in step S303, a histogram for the entire image is calculated. Any method may be used for the histogram calculation. Here, the sRGB value of each pixel is converted into a luminance color difference space (for example, the YCbCr space) to calculate a histogram for each component. If the input image is captured in an underexposure state as a whole, the luminance component histogram (in 8-bit precision) has, as illustrated in FIG. 4, a lopsided distribution toward a dark side.

Next, in step S304, a desired subject is detected from the image. The subject is not specifically limited in the present exemplary embodiment and a face of a person is taken as an example. Various methods have been discussed regarding detection of a person's face and any such method may be used in the present exemplary embodiment.

Next, in step S305, appropriateness of exposure when the image is captured is determined using the above histogram information and face detection information.

Figure 5:
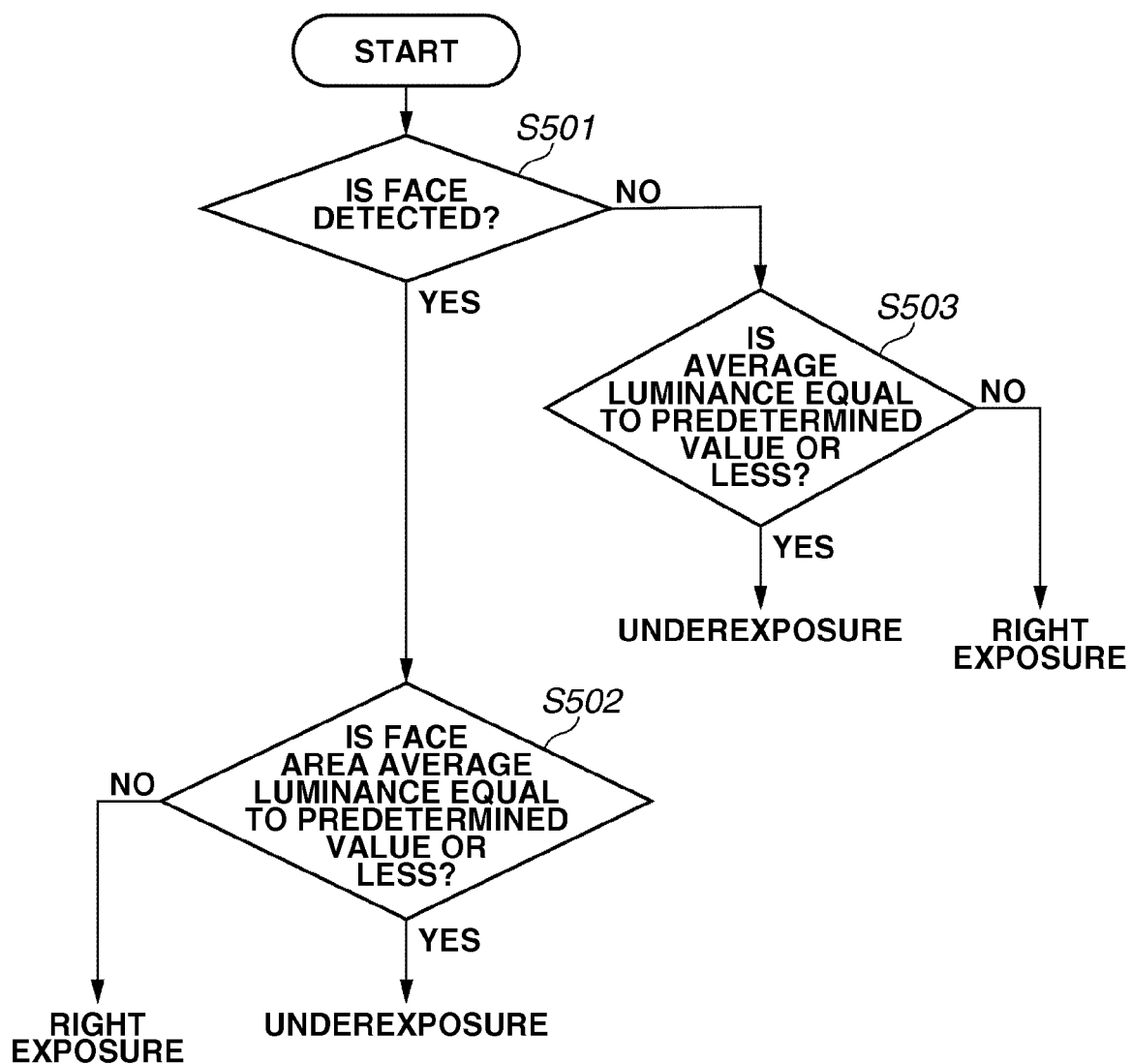
FIG. 5 is a flow chart illustrating an example of exposure appropriateness determination processing.

FIG. 5 illustrates an example of a simple appropriateness determination in the present exemplary embodiment. In step S501, whether any face is detected is determined. If a face has been detected (YES in step S501), then in step S502, average values (ObjY, ObjCb, ObjCr) of the luminance color difference components in the face region and, among these average values, the average luminance ObjY is compared with a predetermined threshold value to determine the degree of appropriateness of exposure. If, as a result of comparison, the average luminance value in the face region exceeds the threshold value (NO in step S502), the exposure is determined to be appropriate. On the other hand, if the average luminance value is less than the threshold value (YES in step S502), the exposure is determined to be insufficient. If no face is detected (NO in step S501), then in step S503, the average luminance value of the entire image calculated from the histogram is compared with a predetermined threshold value. If the average luminance value exceeds the threshold value (NO in step S503), the exposure is determined to be appropriate. If the average luminance value is less than the threshold value (YES in step S503), the exposure is determined to be insufficient. The average values (ObjY, ObjCb, ObjCr) inside the face region calculated here, a coordinate position of the detected face region in the image and the like are used in following processing as attribute information of a subject region.

Returning to FIG. 3, in step S306, the appropriateness of the color balance is determined. Various methods have been discussed regarding appropriateness determination of the color balance and any such method may be used in the present exemplary embodiment. Here, an example in which the degree of appropriateness of the color balance is determined by a method as discussed in Japanese Patent Application Laid-Open No. 2000-013616 and a rotation matrix for color balance correction is generated will be described.

According to Japanese Patent Application Laid-Open No. 2000-013616, the degree of appropriateness of the color balance can be determined by the color difference components at highlight/shadow points in an image. The highlight/shadow points are defined as follows: a cumulative frequency distribution is calculated by accumulating the frequency of the luminance histogram illustrated in FIG. 4 from a side of low luminance, and the point where the cumulative frequency is 99% is defined as the highlight point and the point where the cumulative frequency is 1% as the shadow point. The average value of color difference is calculated only from pixels corresponding to the luminance values determined as the highlight/shadow points. If the color difference is close to 0, the color balance is determined to be appropriate and, with increasing a distance from 0, the color balance is determined to be more inappropriate. When the color balance is determined to be inappropriate, the color balance can be corrected by generating a 3*3 rotation matrix to bring the color difference of the highlight/shadow points closer to 0 in the luminance color difference space and multiplying the luminance color difference components of target pixel values by the rotation matrix. A detailed description regarding generation of the rotation matrix is discussed in Japanese Patent Application Laid-Open No. 2000-013616 and thus, a detailed description thereof will be omitted. The image analysis unit 102 in the present exemplary embodiment has been described.

Figure 6:
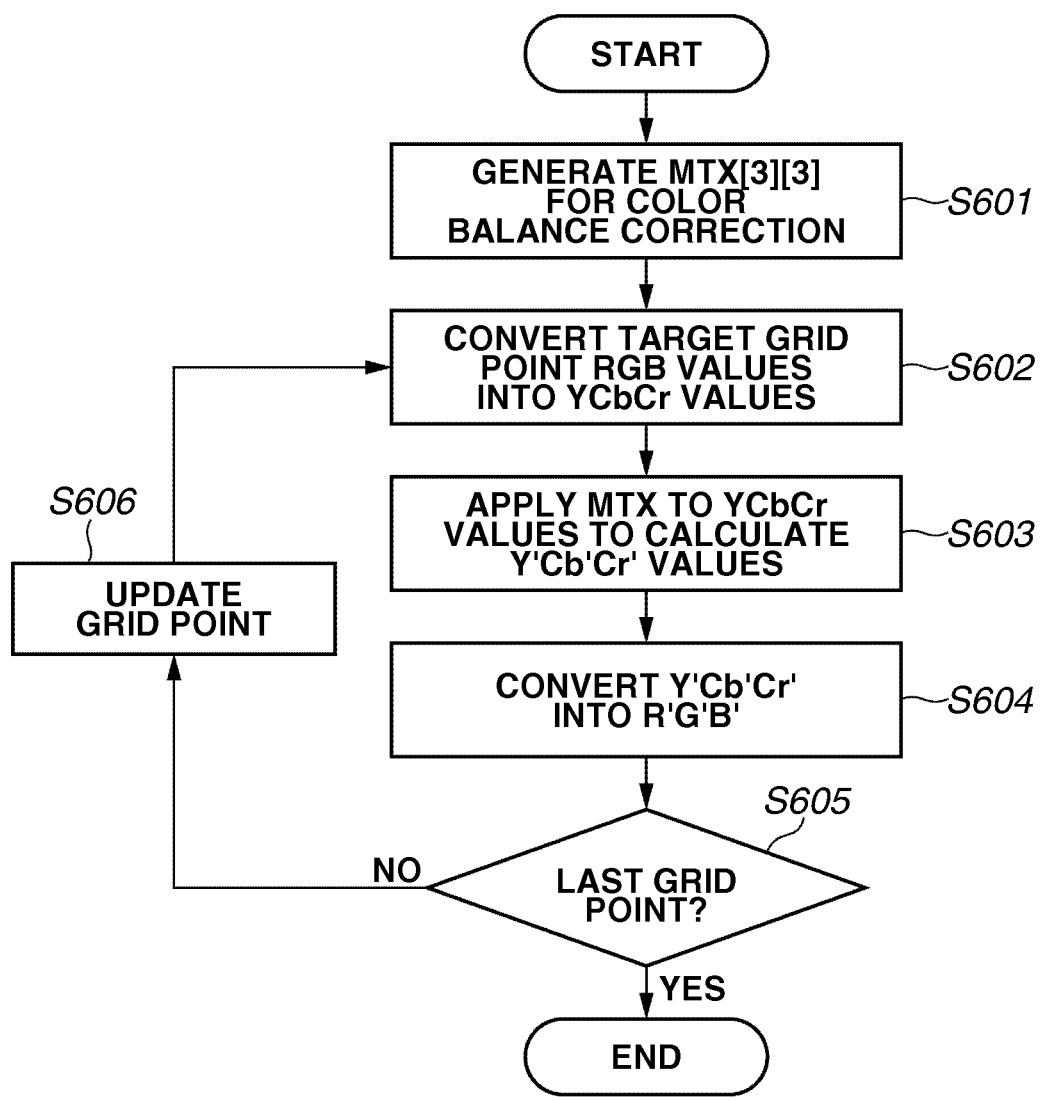
FIG. 6 is a flow chart illustrating first 3DLUT generation processing.

FIG. 6 illustrates a flow chart of processing executed by the first multidimensional LUT generation unit 104. A program to perform the processing is loaded into the RAM 202 from the secondary storage apparatus 204 during execution and is executed under the control of the CPU 201. In the present exemplary embodiment, a 3DLUT in which each RGB component is in 8-bit precision is generated and the grid interval is 32. In this case, the total number of grid points is 9*9*9=729 points. The processing illustrated in FIG. 6 is performed for all these grid points.

First, in step S601, a rotation matrix for color balance correction MTX[3][3] is generated. The generated method thereof is discussed in Japanese Patent Application Laid-Open No. 2000-013616 and thus, a detailed description thereof will be omitted. When it a result of the color balance appropriateness determination in step S306 is appropriate, MTX[3][3] to be generated is a unit matrix as illustrated below:

$$MTX = \begin{bmatrix} 1 & 0 & 0 \\ 0 & 1 & 0 \\ 0 & 0 & 1 \end{bmatrix}$$ [Numerical Expression 1]

Next, in step S602, the RGB values of a target grid point are converted into YCbCr components by a publicly known conversion formula. In step S603, MTX is applied to the YCbCr values using the formula below to calculate Y'Cb'Cr' values after the color balance correction. In the following formula, m00 to m22 show each element value of the rotation matrix generated in step S601.

$$\begin{bmatrix} Y' \\ Cb' \\ Cr' \end{bmatrix} = \begin{bmatrix} m_{00} & m_{01} & m_{02} \\ m_{10} & m_{11} & m_{12} \\ m_{20} & m_{21} & m_{22} \end{bmatrix} \begin{bmatrix} Y \\ Cb \\ Cr \end{bmatrix}$$ [Numerical Expression 2]

In step S604, the calculated Y'Cb'Cr' values are converted into R'G'B' values by a publicly known conversion formula. The R'G'B' values are stored in the 3DLUT as the corrected grid point and stored in the RAM 202.

By performing the processing of steps S602 to S604 described above for all 729 grid points, the first 3DLUT can be generated (first generation).

Figure 7:
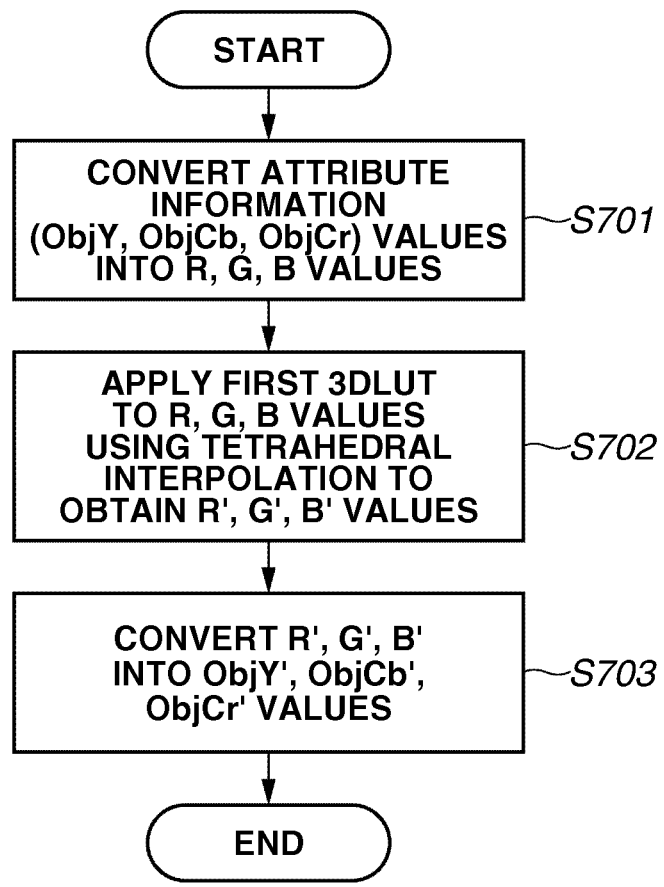
FIG. 7 is a flow chart illustrating subject attribute information update processing.

As a preparation for generating a second 3DLUT described below, the subject attribute update unit 105 updates attribute information 112 of the subject determined by the image analysis unit 102. Update processing of the attribute information is performed according to the flow illustrated in FIG. 7. In step S701, the attribute information 112 (for example, average luminance and the average color difference inside the face region) (ObjY, ObjCb, ObjCr) of the subject input into the subject attribute update unit 105 is converted into RGB values by a publicly known conversion formula. In step S702, the first 3DLUT is applied to the RGB values using a publicly known interpolation method, for example, the tetrahedral interpolation method and, as a result, R'G'B' values after the first 3DLUT being applied is obtained. In step S703, the R'G'B' values are converted into ObjY', ObjCb', and ObjCr' values by a publicly known conversion formula (first correction). Attribute information in which the ObjY', ObjCb', and ObjCr' values are updated is input into the second multidimensional LUT generation unit 106 which is the following processing.

Next, a flow chart of processing executed by the control parameter generation unit 103 will be described. A program to perform the processing is loaded into the RAM 202 from the secondary storage apparatus 204 during execution and is executed under the control of the CPU 201. A control parameter is, as described above, a parameter to control interpolation intensity of the intensity adjustment interpolation unit 108. Since the dodging process is assumed in the present exemplary embodiment, a low-frequency image, that is, a blurred image for an input image is generated as the control parameter.

Figure 8:
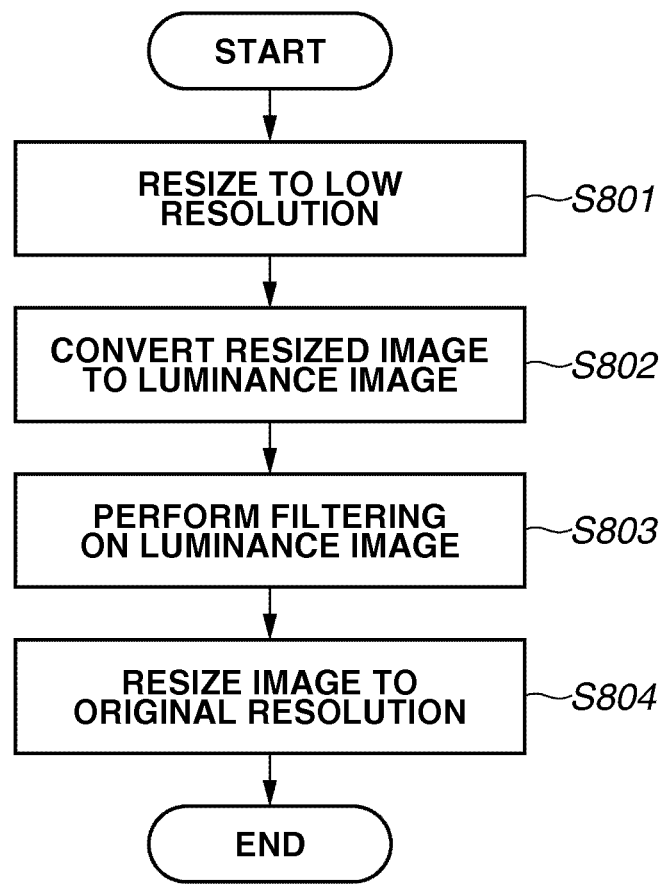
FIG. 8 is a flow chart illustrating control parameter generation processing.

FIG. 8 is a flow chart of processing executed by the control parameter generation unit 103. A low-frequency image generation method is not specifically limited in the present exemplary embodiment. Here, it is described, as an example, processing to once reduce the input image, to perform filtering on the reduced image, and then to restore the image to its original resolution. Filtering generally requires a large amount of calculations and calculation costs thereof can be reduced by performed filtering on the reduced image.

In step S801, the input image, namely the RGB image, is resized to the low-resolution image. A resize method is not specifically limited, and if processing speed takes precedence, thinning processing of most adjacent pixels is effective.

In step S802, the resized RGB image data is converted into a luminance image by a publicly known conversion formula. The luminance image is an image that includes only luminance information about each pixel and becomes a monochrome image.

Then, in step S803, publicly known filtering (smoothing filtering) is performed on the luminance image to generate the low-frequency image. The filtering method is not specifically limited and the simplest example is to apply a smoothing filter as shown by the formula below to each pixel in the reduced image.

$$f = \frac{1}{25}\begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix}$$ [Numerical Expression 3]

In step S804, the obtained low-frequency image is enlarged to its original resolution. At this point, if enlarging processing is performed using most adjacent interpolation, high-frequency components are generated in the resized image, therefore, it is preferable to perform the enlarging processing by linear interpolation.

A dodging method that has been conventionally discussed refers to only examples in which a low-frequency image containing color components is generated. However, in the present exemplary embodiment, as described above, a low-frequency image stores only the luminance component, so that there is an advantage that an amount of the memory necessary for storage is small.

Figure 9:
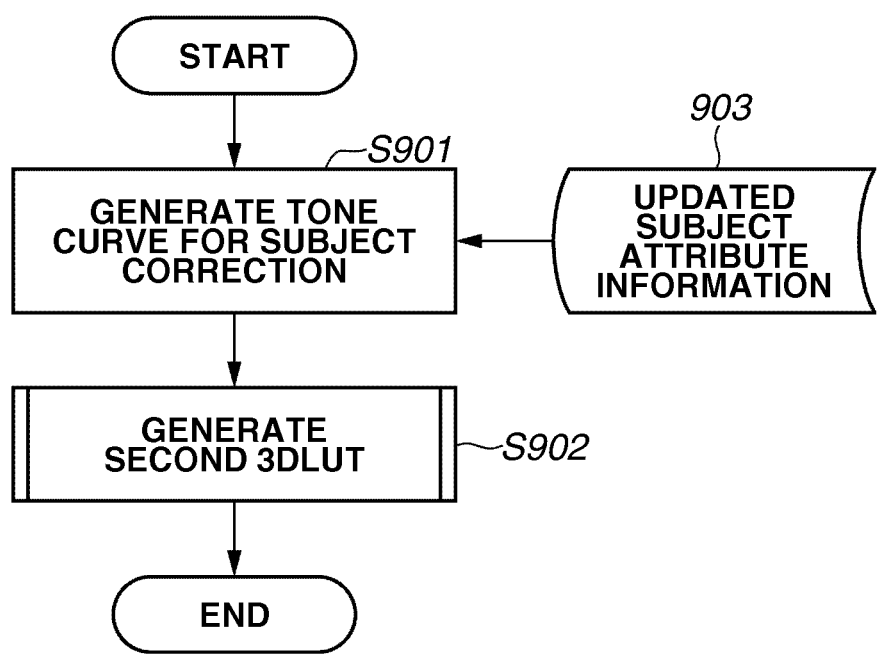
FIG. 9 is a flow chart illustrating second 3DLUT generation processing.
Figure 11:
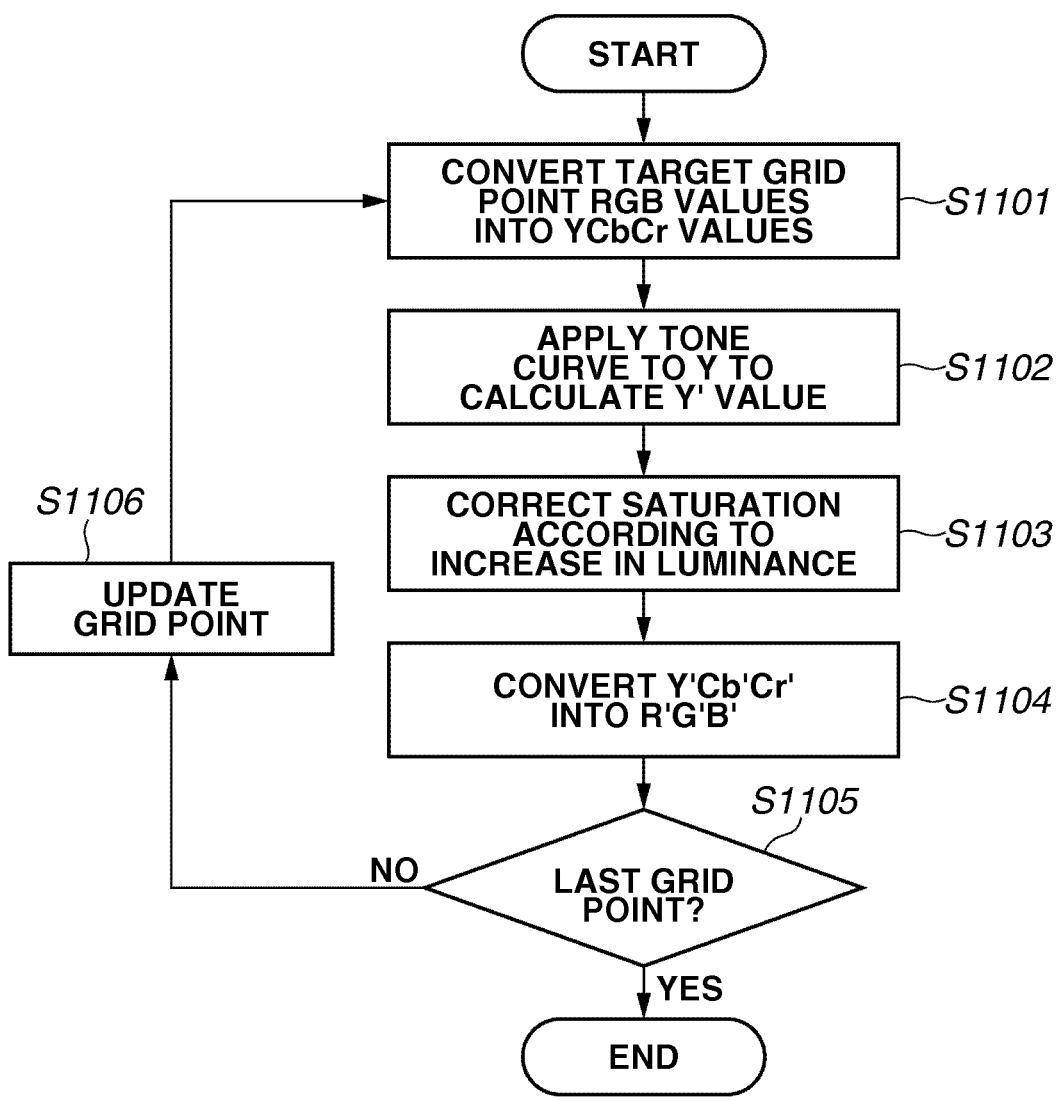
FIG. 11 is a flow chart illustrating the second 3DLUT generation processing.

FIGS. 9 and 11 illustrate flow charts of processing executed by the second multidimensional LUT generation unit 106.

First, in step S901, a tone curve Tc[256] for luminance correction is generated according to the result of the exposure appropriateness determination. The tone curve Tc[256] indicates an array in 8-bit precision and is a one-dimensional lookup table in which a luminance value after correction for a luminance value before the correction is stored.

Figure 10:
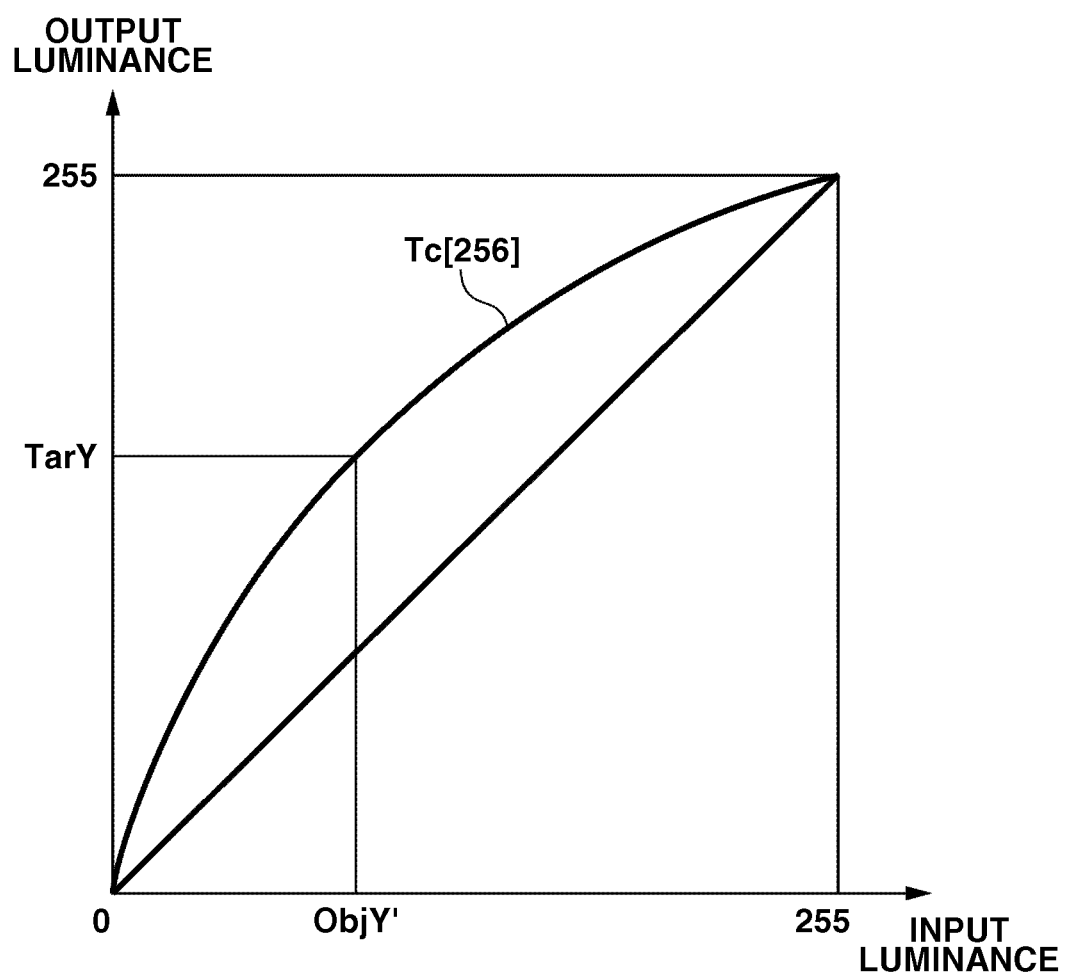
FIG. 10 illustrates a tone curve to appropriately adjust a subject.

FIG. 10 illustrates a generation example of a tone curve when a subject region is determined to be underexposed in the present exemplary embodiment. In FIG. 10, a horizontal axis represents the luminance before the correction and a vertical axis the luminance after the correction. In FIG. 10, a value ObjY' denotes the average luminance in the face region updated by the subject attribute update unit 105 and is a target luminance value of the face region to which TarY is preset. The tone curve Tc[256] is formed as a curve that passes through the point (ObjY', TarY). A curve formation method is not specifically limited in the present exemplary embodiment. For example, the curve need not necessarily link the origin (0, 0) and a white spot (255, 255) as illustrated in FIG. 10 or the curve need not be a curve. In some instances, the similar tone curve may be formed by several straight lines. If the subject region is determined not to be underexposed, the tone curve may be a straight line such that the luminance value before correction and that after the correction match.

After the tone curve for subject correction is generated, next, in step S902, the second 3DLUT for subject correction is generated. FIG. 11 illustrates a detailed flow of step S902.

In FIG. 11, first in step S1101, the RGB values of a target grid point of the 3DLUT is converted into YCbCr values by a publicly known conversion formula. Next, in step S1102, the tone curve Tc calculated in step S901 is applied to the luminance value Y as shown below to calculate a Y' value.

$Y'=Tc[Y]$

In step S1103, saturation correction is performed according to an increase amount in luminance. Generally, if only luminance is increased in the luminance color difference space, the resultant image becomes a poor-looking image with decreased saturation. In the present exemplary embodiment, a saturation enhancement coefficient E represented by the formula below is calculated to solve this problem.

$E=(Y'/Y)*\alpha+\beta$ where E is always 1.0 or more.

In the above formula, $\alpha$ and $\beta$ are optional coefficients and are set, for example, as $\alpha=0.4$ and $\beta=0.6$. The above formula produces E=1.0 when a luminance increasing rate (Y'/Y) is 1.0, and produces E=1.4 when the luminance increasing rate (Y'/Y) is 2.0. E is assumed to be always 1.0 or more so that no saturation reduction occurs.

In step S1103, saturation correction of the target grid point is performed according to the formula below:

$Cb'=Cb*E$ $Cr'=Cr*E$

In step S1105, the corrected Y'Cb'Cr' values calculated by the above processing are converted into R'G'B' values by a publicly known conversion formula and stored in the second 3DLUT.

By performing the processing of steps S1101 to S1104 described above for all grid points, the second 3DLUT can be generated (second generation).

The input image is input into the interpolation unit 107 in which the first 3DLUT is applied by a publicly known interpolation method. In the interpolation unit 107, tint of the input image is corrected (second correction). The interpolation method is not specifically limited in the present invention and such interpolation methods as the tetrahedral interpolation, triangular prism interpolation, and cubic interpolation may be used. Each interpolation method is discussed in many publicly known documents and a detailed description thereof will be omitted.

With the above interpolation processing, the image data (R', G', B') on which the first 3DLUT has been applied is input into the intensity adjustment interpolation unit 108 in the following step.

In the intensity adjustment interpolation unit 108, the second 3DLUT is applied to the image data (R', G', B') while referring to the control parameter 113. In the intensity adjustment interpolation unit 108, the method thereof is not specifically limited and any publicly known interpolation method may be used.

Figure 12:
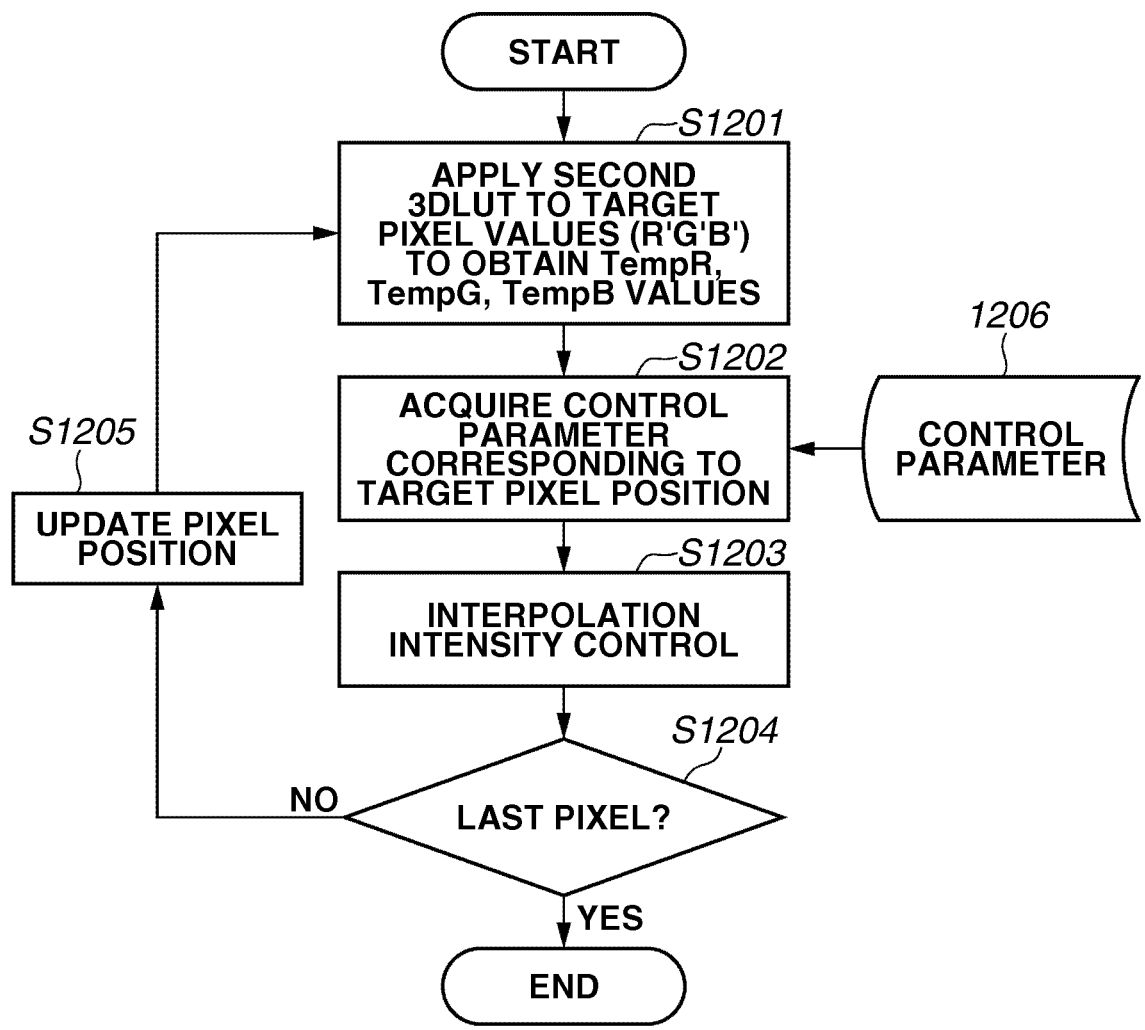
FIG. 12 is a flow chart illustrating processing executed by an intensity adjustment interpolation unit.

The intensity adjustment method used by the intensity adjustment interpolation unit 108 will be described. FIG. 12 illustrates a flow of processing executed by the intensity adjustment interpolation unit 108.

First, in step S1201, the second 3DLUT is applied to the pixel values (R', G', B') stored in a target pixel position (x, y) in the input image to obtain values (TempR, TempG, TempB) after the application.

Next, in step S1202, a control parameter 1206 input into the intensity adjustment interpolation unit 108, that is, the low-frequency luminance image is referenced to acquire (extract) a control parameter value corresponding to the target pixel position (x, y), that is, luminance values BY (x, y).

In step S1203, pixels values (R", G", B") after interpolation intensity control are obtained by formulas below (third correction):

$$R''=(TempR-R')*(1.0-BY(x,y)/255)+R'$$

$$G''=(TempG-G')*(1.0-BY(x,y)/255)+G'$$

$$B''=(TempB-B')*(1.0-BY(x,y)/255)+B'$$

In the above formulas, BY(x, y) is assumed to have values of 0 to 255, so that BY(x, y)/255 have values of 0.0 to 1.0. As understood by referring to the above formulas, if the target pixel is included in a dark region, BY(x, y) has a value close to 0. In that case, an equation R"=TempR is satisfied, so that the second 3DLUT is applied with the maximum intensity. On the other hand, if the target pixel is included in a bright region, BY(x, y) has a value close to 255. In that case, an equation R"=R' is satisfied, so that the second 3DLUT is hardly applied.

By using the configuration as described above, the applied intensity of the second 3DLUT can be controlled by the control parameter 113, so that local correction amount control in an image can be realized.

The corrected image data (R", G", B") is converted into CMYK components which are ink colors in the color conversion unit 109, and formed as an image on a print medium by the printer engine 111 after the pseudo gradation processing such as error diffusion and dithering are performed thereon.

According to the first exemplary embodiment of the present invention, as described above, a plurality of interpolation units is connected in series. Uniform interpolation processing is performed on an entire image by one of the interpolation unit (the interpolation unit 107) and interpolation intensity of the other interpolation unit (the intensity adjustment interpolation unit 108) is controlled by the control parameter 113. Accordingly, processing to perform the uniform correction and the local correction simultaneously, which has been a challenge of the conventional technique, can be realized with a very simple configuration.

Further, according to the present exemplary embodiment, various types of correction processing are performed by using a plurality of 3DLUTs and thus, advantages of the 3DLUT system described in Description of the Related Art can maximally be used.

Moreover, according to the present exemplary embodiment, the first 3DLUT specialized for uniformly correcting an entire image is generated to update attribute information (for example, the luminance value of a face) of a subject using the first 3DLUT. Then, the second 3DLUT specialized for appropriately adjusting the subject is generated based on the updated subject information. By adopting the above described configuration, the degree of independence of both 3DLUTs increases, and the present exemplary embodiment has an advantage that correction parameters of both can extremely easily be set.

In the present exemplary embodiment, as described above, the control parameter, namely a low-frequency image is configured not to store a color component and thus, when compared with a conventional example in which the color components are also stored, the present exemplary embodiment has an advantage that the memory necessary for storing the control parameter is small.

In the present exemplary embodiment, the first 3DLUT is described by adopting exclusively the color balance correction for an entire image, but the present exemplary embodiment is not limited to the color balance correction. For example, when the entire image is underexposed, level correction processing may be incorporated into the first 3DLUT. After correcting the color balance and increasing brightness of the entire image, the second 3DLUT that further adjusts brightness of the subject may be generated.

Figure 13:
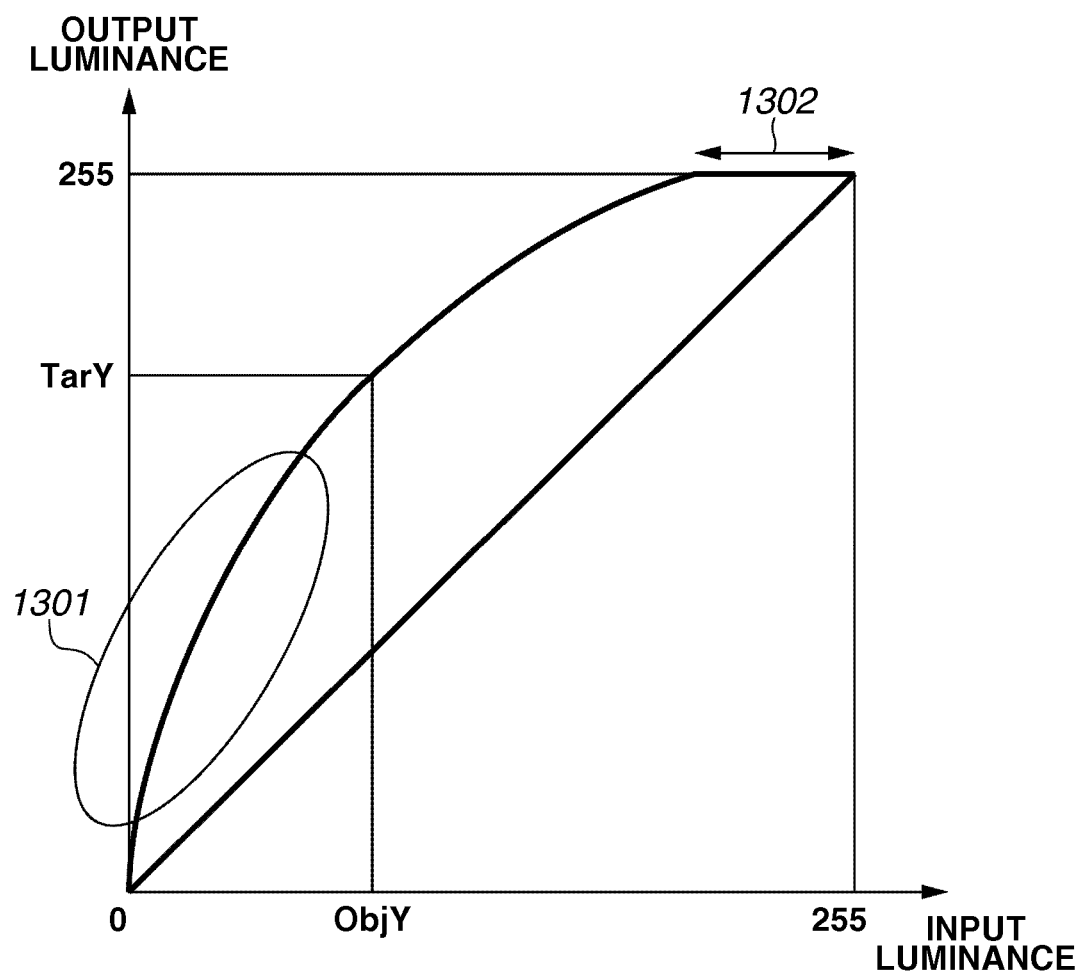
FIG. 13 illustrates an effect of the present invention.

Thus, when the entire image is underexposed and the face of the subject is also dark, a task to attempt to adjust brightness of the subject with only one 3DLUT may arise as in the past. In other words, as illustrated in FIG. 13, a case where inclination of a luminance correction tone curve is too steep on the dark side so that an image defect such as a tone jump may arise. Moreover, if an attempt is made to maintain the inclination of contrast of tone curve halftone at a certain value or greater, there is an issue that an over exposure region increases as indicated by an area 1302. In this respect, if a plurality of 3DLUTs as shown in the present exemplary embodiment shares and performs luminance correction therebetween, there is a special advantage that above described increase of the over exposure region is less likely to arise.

The first exemplary embodiment has been described above, but the present invention is not limited to the above exemplary embodiment. For example, the number of grid points of the 3DLUT is not limited to 729 and may be more or less than 729.

The LUT has been described by fixing to three dimensional LUT for sake of simplicity, but similar processing can be performed on, for example, four CMYK components and in such a case, four-dimensional LUTs is generated. The present exemplary embodiment has been described by limiting the luminance color difference space to the YCbCr space for sake of simplicity, but the luminance color difference space may be another color space, for example, CIE Lab. The present exemplary embodiment has been described by limiting the number of interpolation units to two for sake of simplicity, but a plurality of interpolation units may further be connected in series if necessary. Further in the present exemplary embodiment, the interpolation unit is assumed to perform software processing using the CPU mounted on the hardware 200. However, if the interpolation unit alone is configured as a hardware circuit as necessary, the present inventions can be achieved. In the present exemplary embodiment, image data input into and output from the interpolation unit is assumed to be a frame for one image. However, the unit of input into and output from the interpolation unit may be, for example, the pixel or a band that bundles a predetermined number of lines.

In the first exemplary embodiment, the second 3DLUT is generated by using such a tone curve that an average luminance value ObjY' of a face is corrected to a target luminance value TarY using subject attribute information (ObjY', ObjCb', ObjCr') on which the first 3DLUT has been applied.

However, there is an issue that if a correction is performed by the intensity adjustment interpolation unit 108 as described in the first exemplary embodiment using the 3DLUT, the average luminance value of a face does not become the target luminance value TarY, correctly.

It is assumed, for example, that ObjY'=60 and TarY=140. If the second 3DLUT is applied with the maximum intensity in the intensity adjustment interpolation unit 108, the face region is correctly converted to the target luminance value TarY=140. However, as described in the first exemplary embodiment, the intensity adjustment interpolation unit 108 actually controls the applied intensity thereof by the control parameter 113, namely a low-frequency luminance image (low-resolution image). Thus, if the average luminance value of the face region in the low-frequency luminance image (blurred image) indicated by the control parameters 113 is 50, for example, the applied intensity of the second 3DLUT becomes, according to the control formula of the intensity adjustment interpolation unit 108, 1.0−(50/255)=0.8. That is, the applied intensity is about 80%.

In other words, ObjY' whose luminance value is 60 is corrected up to 124.

In a second exemplary embodiment, in view of this problem, an image processing apparatus that can properly control brightness of a subject to target brightness if the applied intensity of the second 3DLUT is controlled by the control parameter.

Figure 14:
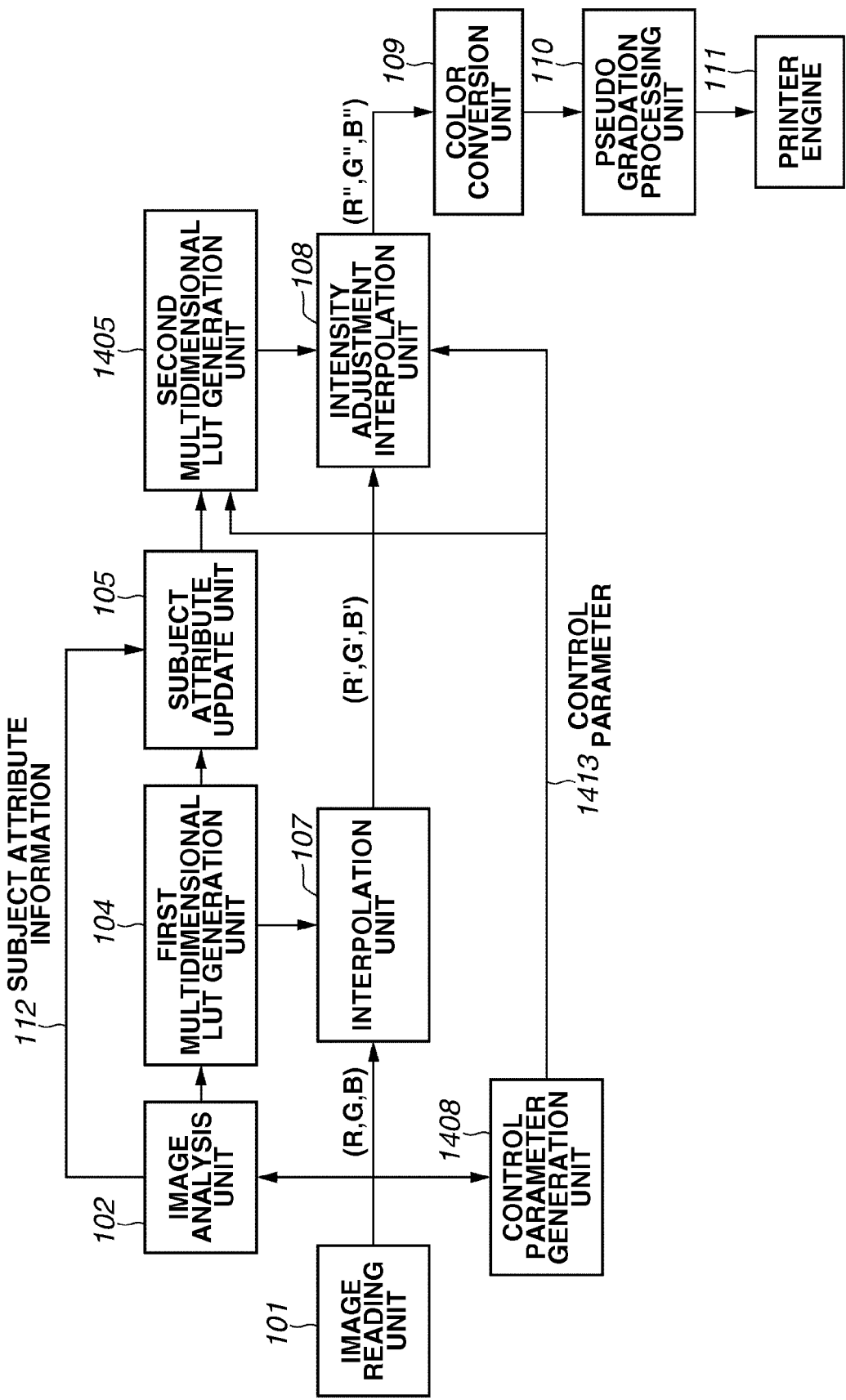
FIG. 14 illustrates a block diagram of processing in a second exemplary embodiment of the present invention.

FIG. 14 illustrates a block diagram of processing in the present exemplary embodiment. What is different from the first exemplary embodiment is that a control parameter 1413 generated by a control parameter generation unit 1408 is input into a second multidimensional LUT 1405. The image reading unit 101, the image analysis unit 102, the first multidimensional LUT generation unit 104, the subject attribute update unit 105, the interpolation unit 107, the intensity adjustment interpolation unit 108, the color conversion unit 109, the pseudo gradation processing unit 110, the printer engine 111, and the subject attribute information 112 in FIG. 14 are similar to those in FIG. 1.

Figure 15:
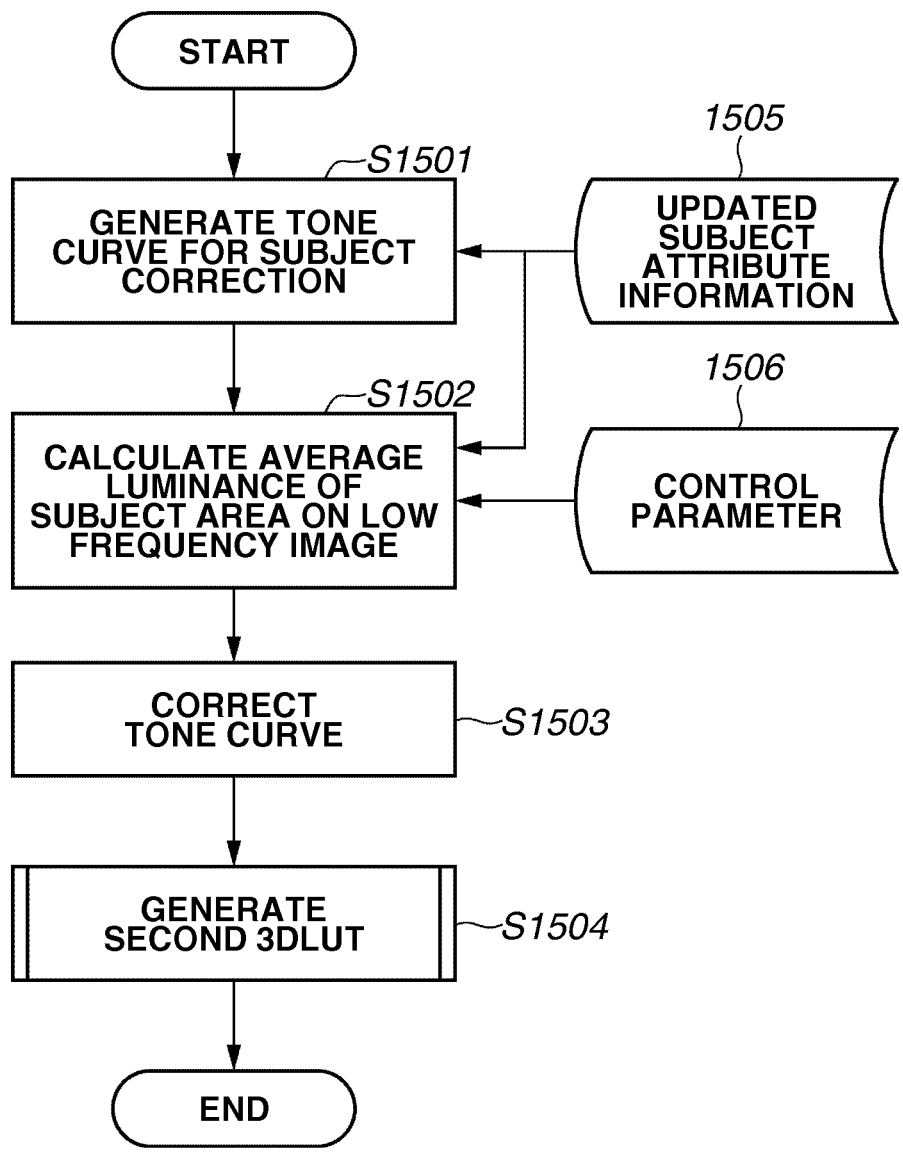
FIG. 15 is a flow chart illustrating tone curve correction processing in the second exemplary embodiment.

FIG. 15 illustrates a flow chart of processing executed by the second multidimensional LUT 1405 in the present exemplary embodiment.

In step S1501, similar to the first exemplary embodiment, a tone curve for subject correction is generated.

Next, in step S1502, average luminance FBY of a subject region is calculated on a control parameter 1506, namely a low-frequency luminance image input into the second multidimensional LUT 1405. The average luminance can be calculated based on a coordinate position of the subject region in an image included in subject attribute information 1505.

Next, in step S1503, the tone curve is corrected using the FBY value. The correction step will be described using FIG. 16.

Figure 16:
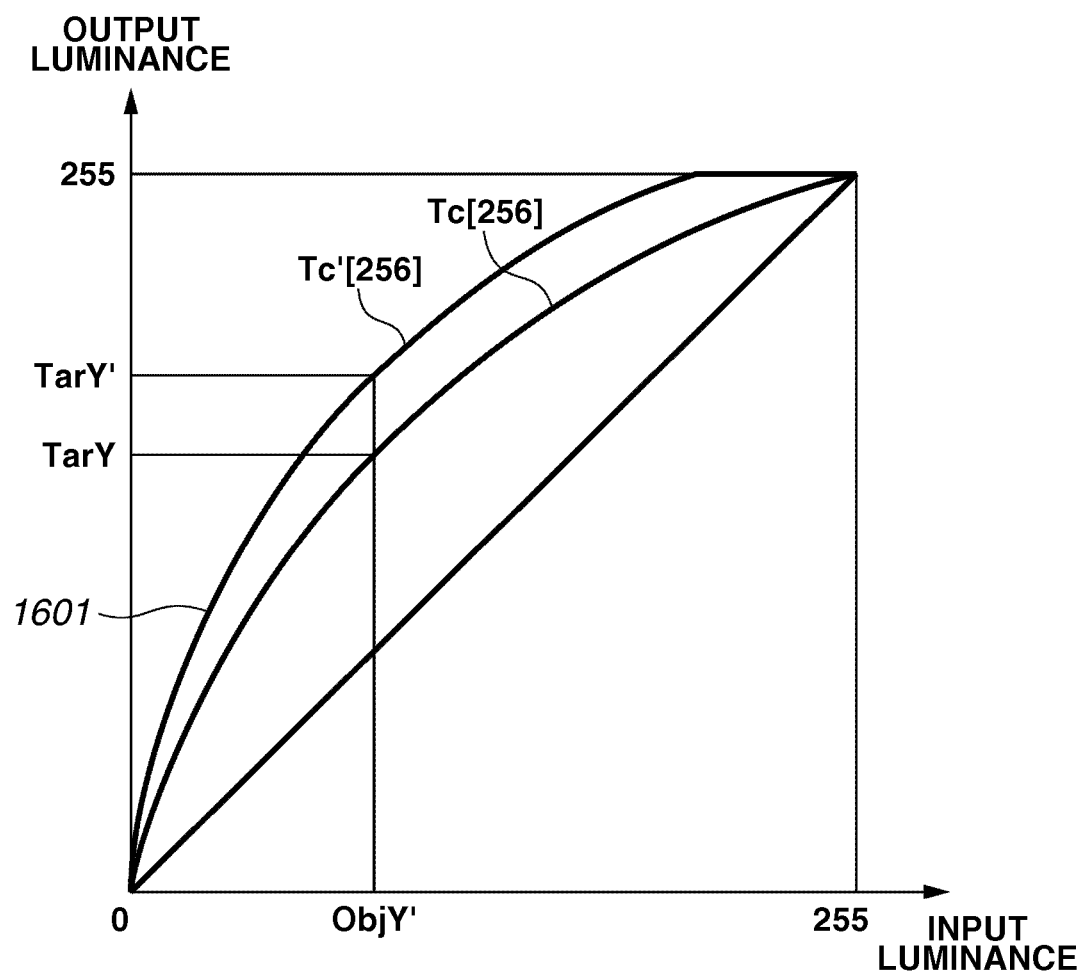
FIG. 16 illustrates a tone curve after correction.

In FIG. 16, the tone curve Tc[256] is for subject correction described in the first exemplary embodiment. The tone curve itself can correct the ObjY' value which is an updated subject luminance value to the target luminance value TarY. However, as described above, it is more likely that the target luminance value TarY is not reached finally due to a relation with the control parameter.

In the present exemplary embodiment, a TarY' value is calculated according to the formula below and the second 3DLUT is generated by using a tone curve Tc'[256] passing through the TarY' value.

$$(TarY'-ObjY') \times (1.0-FBY/255.0) + ObjY' = TarY \quad \text{[Numerical Expression 4]}$$

Based on the above formula, the following formula is obtained:

$$TarY' = \frac{(TarY - ObjY')}{\left(1.0 - \frac{FBY}{255}\right)} + ObjY' \quad \text{[Numerical Expression 5]}$$

Based on the above formula, the following formula is obtained:

$$Tc'[k]=Tc[k]*(TarY'/TarY) \quad (k=0 \text{ to } 255)$$

The above formula represents that TarY'=TarY if FBY=0, and TarY'=2*TarY−ObjY' if FBY=128. Tc'[k] can generate a tone curve 1601 as illustrated in FIG. 16 by multiplying Tc [k] by a magnification (TarY'/TarY).

The above example will be described more specifically. It is assumed that ObjY'=60, TarY=140, and FYB=51.

In this case, the above formulas yield TarY'=160. If FYB=51, an effectiveness rate of the second 3DLUT is 80% and thus, a final face average value becomes (160−60) 0.8+60=140, so that an initial target luminance value can be reached.

Processing hereafter is similar to those in the first exemplary embodiment. Thus, detailed processing will not be repeated.

According to the present exemplary embodiment, as described above, the tone curve for subject correction which is once generated may be corrected using the average value of the subject region of the control parameter, so that the final output can be made a result assumed as a target image quality.

In the present exemplary embodiment, following the first exemplary embodiment, a method for calculating the tone curve Tc[256] for subject correction and then collecting the tone curve has been described, but the present invention is not limited to this configuration. For example, when a tone curve Tc is calculated, a value TarY' may be calculated in advance and a tone curve passing through a point (ObjY', TarY') may be generated as the tone curve Tc.

In the first exemplary embodiment, it is assumed that two 3DLUTs input into the two interpolation units have the same 729 grid points and each RGB component thereof has 8-bit precision for sake of simplicity, but the present invention is not limited to this configuration.

For example, there are some cases where a system as a whole operates more effectively if the number of grid points and bit precision are different from 3DLUT to 3DLUT according to the type or properties of correction to be performed by each 3DLUT. Such a case will be described in a third exemplary embodiment.

Figure 17:
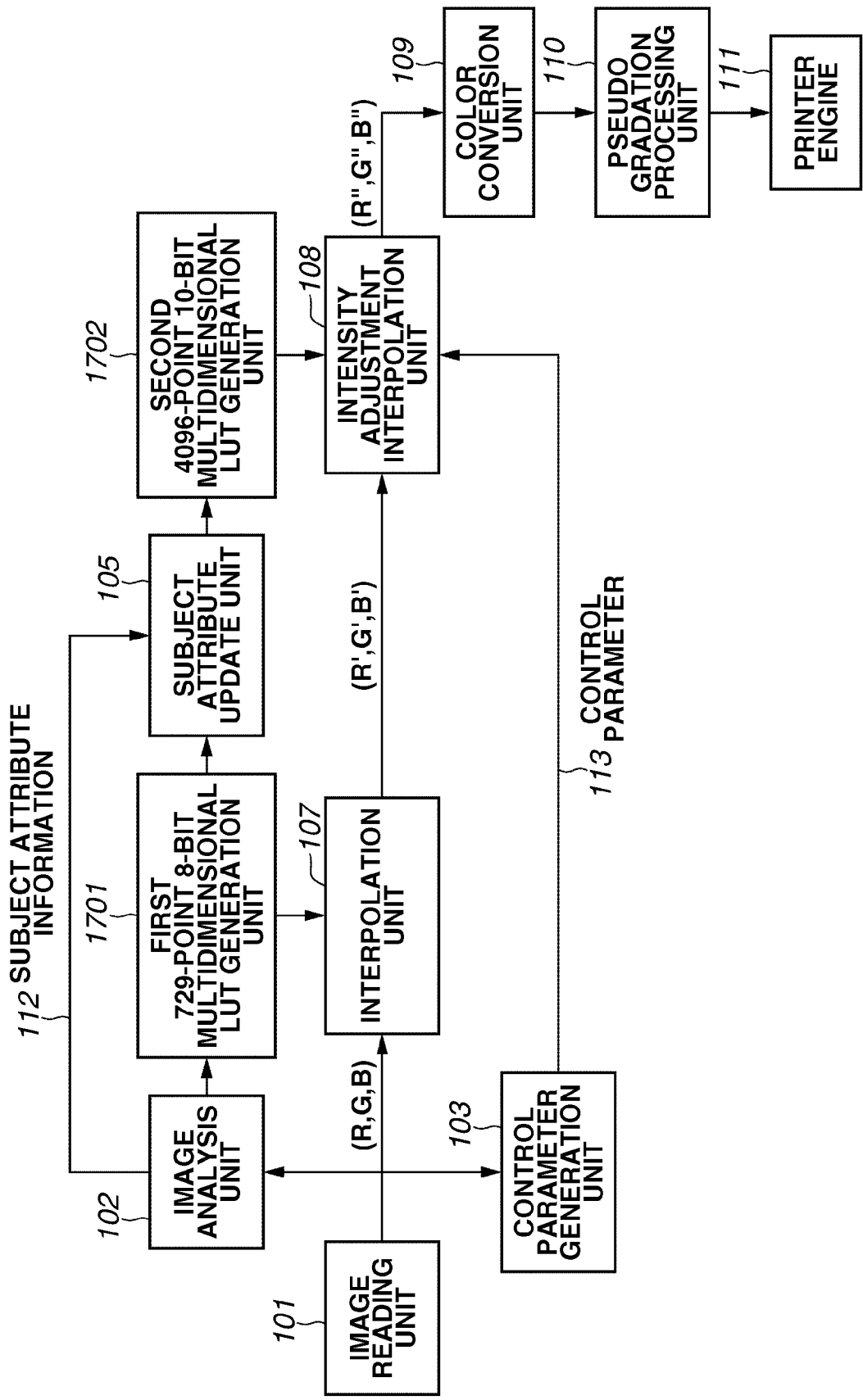
FIG. 17 illustrates a block diagram of processing in a third exemplary embodiment.

FIG. 17 illustrates a block diagram of processing in the present exemplary embodiment. What is different from the first exemplary embodiment is that a 3DLUT generated by a first 729-point 8-bit multidimensional generation unit 1701 includes 8-bit components and 720 grid points, and a 3DLUT generated by a second 4096-point 10-bit multidimensional generation unit 1702 includes 10-bit components and 4096 grid points. The reason therefor will be described below. The image reading unit 101, the image analysis unit 102, the control parameter generation unit 103, the subject attribute update unit 105, the interpolation unit 107, the intensity adjustment interpolation unit 108, the color conversion unit 109, the pseudo gradation processing unit 110, the printer engine 111, the subject attribute information 112, and the control parameter 113 in FIG. 17 are similar to those in FIG. 1.

The first 3DLUT has, as described above, the property of specializing in adjustment of an entire image and thus is in general less likely to cause non-linear behavior in the RGB color space. For example, the color fog correction using a rotation matrix described in the first exemplary embodiment is a linear transformation, and the level correction and saturation enhancement do not have extreme non-linearity. Corrected pixel values of the 3DLUTs used for such conversions can maintain sufficient precision to the target value even if the number of grid points or bit precision is low.

The second 3DLUT, on the other hand, has the property of specializing in adjustment of a subject, instead of an entire image, and an occurrence of, for example, an image defect such as a tone jump on the dark side due to a steep tone curve for gradation correction can be considered. Therefore, gradation properties can be enhanced by storing each RGB component as, for example 10-bit data, instead of 8-bit data, so that occurrence of the image defect can be suppressed. If the subject is a person, non-linear processing such as correcting only, for example, a skin-colored region to desired saturation may be requested. In such a case, correction processing with high precision can be performed for such non-linear processing by providing, like the present exemplary embodiment, 4096 grid points of the second 3DLUT, which are more than 729 points, to make a distance between grid points shorter.

Other processing is similar to that in the first exemplary embodiment and a detailed description thereof will not be repeated.

According to the present exemplary embodiment, as described above, in an image processing apparatus that stores a plurality of multidimensional LUTs, the number of grid points or bit precision is different for each multidimensional LUT according to content of processing to be performed by each LUT. Accordingly, for example, the overall RAM capacity used for storing LUTs can be reduced. If, for example, two LUTs in which each RGB component includes 16-bit data and the number of grid points is 4096 are stored, a 48-KB RAM is needed. On the other hand, if one LUT in which each RGB component includes 8-bit data and the number of grid points is 729 is adopted, the RAM capacity storing the LUTs is 26 KB which is about a 46% reduction compared with the above case.

When the interpolation unit 107 and the intensity adjustment interpolation unit 108 are implemented as hardware circuits, by adopting interpolation processing in 8-bit precision for one unit, instead of 16-bit precision for both units, an effect is available that a scale of the whole interpolation circuits is reduced and equivalent output results are obtained.

The present exemplary embodiment has been described by limiting the number of interpolation units to two and the number of grid points and bit precision of both interpolation units for sake of simplicity, but the present invention is not limited to this configuration. Any combination of the number of interpolation units, the number of grid points, and the number of bits capable of realizing an effect of the present invention is included in the scope of the present invention.

In the foregoing, the third exemplary embodiment has been described.

The above exemplary embodiments have been described by taking 3DLUTs including RGB components as an example for sake of simplicity, but the present invention is not limited to this configuration. For example, the exemplary embodiments according to the present invention can be configured with 3DLUTs including YCbCr values which are luminance color difference components. Further, four-dimensional LUTs including CMYK values which are ink components can similarly be adopted. Furthermore, in a case where if still higher dimensional LUTs are adopted, it can be included in the scope of the present invention.

The above exemplary embodiments have been described by taking the tetrahedral interpolation as an example of the interpolation method for sake of simplicity, but the present invention is not limited to this method. Whatever interpolation method, for example, the publicly known cubic interpolation or triangular prism interpolation is used, such exemplary embodiments are included in the scope of the present invention.

In the above exemplary embodiments, it is assumed that the subject is a region of a person's face and the number thereof is one for sake of simplicity, but the present invention is not limited to this assumption. For example, the subject may be an object other than a person's face (for example, an animal or building) and the number thereof may not be one. If there is a plurality of such subjects, processing may be performed by restricting to a typical one or averaging attribute information of all subjects.

The above exemplary embodiments have been described by taking the dodging process as a typical example of the local image correction for sake of simplicity, but the present invention is not limited to this configuration. If, for example, a blue sky region is detected and processing to correct only the region in a desirable direction of a hue and saturation is considered as the local correction, this can be realized extremely efficiently by the constitution of the present invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-128568 filed May 28, 2009, which is hereby incorporated by reference herein in its entirety.

What is claimed is:

1. An image processing apparatus including:
    a detection unit configured to detect a specific object in an image;
    an update unit configured to update a value obtained from the specific object detected by the detection unit using a first lookup table for correcting the image, the first lookup table being generated based on a characteristic amount of the image;
    a generation unit configured to generate, based on the value updated by the update unit, a second lookup table for correcting a luminance value of the specific object; and
    a correction unit configured to correct the image using the generated first lookup table and second lookup table.

2. The image processing apparatus according to claim 1, wherein the first lookup table and the second lookup table are different in the number of grid points thereof and table bit precision.

3. The image processing apparatus according to claim 1, wherein the specific object is a face of a person.

4. The image processing apparatus according to claim 1, wherein the second lookup table is a three-dimensional lookup table with RGB components.

5. A non-transitory computer readable medium causing a computer to function as an image processing apparatus according to claim 1.

6. The image processing apparatus according to claim 1, wherein the number of bits of each color component included in the second lookup table is greater than the number of bits of each color component included in the first lookup table.

7. The image processing apparatus according to claim 1, wherein the value obtained from the specific object is the luminance value of the specific object.

8. The image processing apparatus according to claim 1, wherein the generation unit configured to generate a second lookup table generates a second lookup table for converting the value updated by the update unit into a target luminance value.

9. The image processing apparatus according to claim 1, wherein the correction unit controls an amount of correction to correct the image using the second lookup table based on luminance information obtained from the image.

10. The image processing apparatus according to claim 1, wherein the update unit does not update a value in an area other than the specific object in the image.

11. The image processing apparatus according to claim 1, wherein the update unit updates only the value obtained from the specific object.

12. The image processing apparatus according to claim 1, wherein the value obtained from the specific object is an average luminance value of the specific object.

13. The image processing apparatus according to claim 1, wherein the update unit updates the value obtained from an area of the specific object.

14. A method for processing an image including:
detecting a specific object in an image;
updating a value obtained from the detected specific object using a first lookup table for correcting the image, the first look up table being generated based on a characteristic amount of the image;
generating, based on the updated value, a second lookup table for correcting a luminance value of the specific object; and
correcting the image using the generated first lookup table and second lookup table.

15. The method according to claim 14, wherein the first lookup table and the second lookup table are different in the number of grid points thereof and table bit precision.

16. The method according to claim 14, wherein the specific object is a face of a person.

17. The method according to claim 14, wherein the second lookup table is a three-dimensional lookup table with RGB components.

18. The image processing method according to claim 14, wherein a value in an area other than the specific object in the image is not updated in the updating.

19. The image processing method according to claim 14, wherein only the value obtained from the specific object is updated in the updating.

20. The image processing method according to claim 14, wherein the value obtained from the detected specific object is an average luminance value of the detected specific object.

21. The image processing method according to claim 14, wherein the value obtained from an area of the specific object is updated in the updating.

* * * * *